UNITED STATES PATENT OFFICE.

JOHN BROCK, OF PHILADELPHIA, PENNSYLVANIA.

COMPOSITION OF MATTER FOR BRICKS.

SPECIFICATION forming part of Letters Patent No. 579,420, dated March 23, 1897.

Application filed June 22, 1896. Serial No. 596,514. (No specimens.)

*To all whom it may concern:*

Be it known that I, JOHN BROCK, a citizen of the United States, residing at Philadelphia, in the county of Philadelphia and State of Pennsylvania, have invented a new and useful Composition Brick and the Composition of Matter to be Used for the Manufacture of Bricks, of which the following is a specification.

My composition consists of the following ingredients, combined in the proportions stated, viz: slaked lime, one pound; ground cinders, ten pounds; disintegrated ashes, ten pounds; coke-dust, ten pounds; culm, ten pounds; sulfur, one pound.

The ashes are to be thoroughly disintegrated, and the coke, cinders, and culm ground to fine particles. These ingredients are to be thoroughly mingled by mechanical agitation and then shaped in molds, subjected to considerable pressure, and finally dried by air or in a kiln, after which it will be found that the bricks are very light, yet capable of standing enormous pressure.

If desired, a small percentage of alum may be added to the composition, and also, if found desirable, the sulfur may be omitted; but as this gives great tenacity to the ingredients I prefer to add the same for certain classes of work.

The advantages of a brick made in accordance with my improvement is that when used for inside work it will absorb a large quantity of moisture in proportion to the surface exposed, thus tending to keep the other parts of the building dry.

It is obvious that clinkers or furnace refuse when properly ground may be substituted for the cinders.

Having thus fully described my invention, what I claim as new and useful is—

The herein-described composition of matter for the production of bricks and the like consisting of the following parts by weight: slaked lime, one part; ground cinders, ten parts; disintegrated ashes, ten parts; coke-dust, ten parts; culm, ten parts; sulfur, one part.

In testimony whereof I have hereunto affixed my signature in the presence of two subscribing witnesses.

JOHN BROCK.

Witnesses:
   S. S. WILLIAMSON,
   MARK BUFORD.